US010162317B2

(12) United States Patent
Toh

(10) Patent No.: US 10,162,317 B2
(45) Date of Patent: Dec. 25, 2018

(54) REAL-TIME FEEDBACK CONTROL FOR PERFORMING TOOLING OPERATIONS IN ASSEMBLY PROCESSES

(71) Applicant: The Boeing Company, Chicago, IL (US)

(72) Inventor: Chin H. Toh, Orange, CA (US)

(73) Assignee: The Boeing Company, Chicago, IL (US)

( * ) Notice: Subject to any disclaimer, the term of this patent is extended or adjusted under 35 U.S.C. 154(b) by 745 days.

(21) Appl. No.: 13/929,138

(22) Filed: Jun. 27, 2013

(65) Prior Publication Data

US 2015/0005945 A1 Jan. 1, 2015

(51) Int. Cl.
*G05B 15/02* (2006.01)
*G05B 19/418* (2006.01)
(Continued)

(52) U.S. Cl.
CPC .............. *G05B 15/02* (2013.01); *B21J 15/02* (2013.01); *B21J 15/28* (2013.01); *B21J 15/285* (2013.01); *G05B 13/042* (2013.01); *G05B 19/41805* (2013.01); *G05B 19/41885* (2013.01); *G05B 2219/31031* (2013.01); *G05B 2219/32182* (2013.01); *G05B 2219/32216* (2013.01);
(Continued)

(58) Field of Classification Search
CPC ..................... G05B 19/401; G05B 2219/49181
See application file for complete search history.

(56) References Cited

U.S. PATENT DOCUMENTS 3,747,467 A * 7/1973 Rosman .................... B21J 15/02
29/509
5,402,367 A * 3/1995 Sullivan .............. G03F 7/70516
702/85
(Continued)

FOREIGN PATENT DOCUMENTS

CN 1122018 A 5/1996
EP 0671677 A1 9/1995
EP 1457853 A1 9/2004

OTHER PUBLICATIONS

Extended European Search Report, dated Sep. 29, 2016, regarding Application No. EP14172964.0, 12 pages.
(Continued)

*Primary Examiner* — Kenneth M Lo
*Assistant Examiner* — David J Wynne
(74) *Attorney, Agent, or Firm* — Yee & Associates, P.C.

(57) ABSTRACT

A method and apparatus for controlling a tooling operation to be performed by a tooling system in an assembly process. A current set of parameter values for a set of parameters for the tooling system are modified iteratively, until the current set of parameter values are determined to result in the tooling operation producing an output that meets a set of criteria, to form a final set of parameter values. The tooling operation is performed with the tooling system using the final set of parameter values. A determination is made as to whether the output of the tooling operation meets the set of criteria based on sensor data about the output. A new set of parameter values are identified as the current set of parameter values to be evaluated in response to a determination that the output of the tooling operation does not meet the set of criteria.

19 Claims, 7 Drawing Sheets

(51) Int. Cl.
  *B21J 15/28* (2006.01)
  *G05B 13/04* (2006.01)
  *B21J 15/02* (2006.01)

(52) U.S. Cl.
  CPC .............. *G05B 2219/32359* (2013.01); *G05B 2219/36252* (2013.01); *G05B 2219/37576* (2013.01); *G05B 2219/45088* (2013.01); *Y02P 90/04* (2015.11); *Y02P 90/22* (2015.11); *Y02P 90/26* (2015.11)

(56) References Cited

U.S. PATENT DOCUMENTS

| | | | | |
|---|---|---|---|---|
| 5,673,368 | A * | 9/1997 | Broese | B21B 37/00 706/23 |
| 5,675,887 | A * | 10/1997 | Gajewski | B21J 15/10 29/243.53 |
| 5,917,726 | A * | 6/1999 | Pryor | G05B 19/41875 29/712 |
| 6,502,008 | B2 * | 12/2002 | Maurer | B21J 15/025 29/716 |
| 6,550,118 | B2 * | 4/2003 | Smith | B23B 41/00 29/26 A |
| 6,760,716 | B1 * | 7/2004 | Ganesamoorthi | G05B 13/027 706/14 |
| 6,985,792 | B2 * | 1/2006 | Tomelleri | G05B 19/401 700/176 |
| 7,191,032 | B2 * | 3/2007 | MacEwen | B21D 26/033 220/562 |
| 7,620,150 | B1 * | 11/2009 | Annis | A61B 6/483 378/87 |
| 7,856,281 | B2 * | 12/2010 | Thiele | G05B 13/048 700/28 |
| 7,933,679 | B1 * | 4/2011 | Kulkarni | G05B 13/0265 700/173 |
| 7,983,387 | B1 | 7/2011 | Toh et al. | |
| 8,391,998 | B2 * | 3/2013 | Weinzierl | G05B 17/02 700/103 |
| 9,021,677 | B1 * | 5/2015 | Burns | B23Q 17/005 29/407.08 |
| 2001/0027597 | A1 * | 10/2001 | Mauer | B21J 15/025 29/407.04 |

OTHER PUBLICATIONS

Canadian Intellectual Property Office Examination Report, dated Jul. 20, 2016, regarding Application No. 2,851,451, 3 pages.
State Intellectual Property Office of the PRC Notification of First Office Action, dated Sep. 26, 2017, regarding Application No. 201410298597.2, 37 pages.
State Intellectual Property Office of the PRC, Notification of Second Office Action, Search Report, and English Translation, dated May 10, 2018, regarding Application No. 201410298597.2, 26 pages.
Japanese Notice of Reasons for Rejection and English Translation, dated Jul. 3, 2018, regarding Application No. 20140127901, 9 pages.

* cited by examiner

REAL-TIME FEEDBACK CONTROL FOR PERFORMING TOOLING OPERATIONS IN ASSEMBLY PROCESSES

BACKGROUND INFORMATION

1. Field

The present disclosure relates generally to tooling operations and, in particular, to using feedback control to improve the efficiency of performing these tooling operations in assembly processes. Still more particularly, the present disclosure relates to a method and apparatus for managing a set of parameters for a tooling system in real-time using digital modeling and feedback control.

2. Background

The production of components for manufactured objects, such as an aircraft, an aircraft engine, or some other type of object, may be a complex, expensive, and time-consuming process. Because of the tolerances required for such components and the stresses placed on these components, extensive testing may typically need to be performed on prototypes of these components. Based on the results of testing, designs of components may need to be adjusted. In some cases, a design of a component may need to be discarded and recreated.

An object such as, for example, without limitation, an aircraft, may be formed from thousands of manufactured components. These components may need to be manufactured and assembled according to certain specifications within strict tolerances. A change order for a single component may require other changes in many other related components. In some cases, a single change order may cause a ripple effect throughout the entire production cycle of the aircraft. Further, changes to a component, even changes that are considered minor may require a full cycle of testing to ensure that these changes are made according to required specifications.

During the assembly of an aircraft, thousands of fastener elements such as, for example, without limitation, rivets, may be used in assembling the various components of the aircraft. Rivets may vary in type, size, and/or material composition.

Prior to using a tool to install a rivet, many iterations of testing may be required to ensure that the rivet that will be formed by the tool will meet the required specifications. Some currently available methods of testing include using trial and error testing. For example, without limitation, test coupons may be used to obtain a set of parameters for the tool that will allow the rivet to be formed according to the required specifications. Several iterations of testing using these test coupons may be needed to identify an optimal set of parameters.

Any changes in the original design for the rivet to be formed or the components to be assembled using the rivet may require that the testing be repeated. Repeating this process may require more time and effort than desired. Further, this type of testing may require more time and be more expensive than desired. Therefore, it would be desirable to have a method and apparatus that take into account at least some of the issues discussed above, as well as other possible issues.

SUMMARY

In one illustrative embodiment, a method for controlling a tooling operation to be performed by a tooling system may be provided. A current set of parameter values for a set of parameters for the tooling system are modified iteratively, until the current set of parameter values are determined to result in the tooling operation producing an output that meets a set of criteria, to form a final set of parameter values. The tooling operation with the tooling system is performed using the final set of parameter values. A determination is made as to whether the output of the tooling operation meets the set of criteria based on sensor data about the output of the tooling operation. A new set of parameter values are identified as the current set of parameter values to be evaluated in response to the determination that the output of the tooling operation does not meet the set of criteria.

In another illustrative embodiment, an apparatus comprises a modeler, a quality checker, and a parameter modifier. The modeler is configured to modify, iteratively, a current set of parameter values for a set of parameters for a tooling system, until the current set of parameter values are determined to result in a tooling operation producing an output that meets a set of criteria, to form a final set of parameter values. The quality checker is configured to determine whether the output of the tooling operation meets the set of criteria based on sensor data about the output of the tooling operation. The parameter modifier is configured to identify a new set of parameter values as the current set of parameter values to be evaluated in response to a determination that the output of the tooling operation does not meet the set of criteria.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a system for adjusting the parameters of a tooling system, such as a riveting system, in substantially real time while tooling operations are being performed. The illustrative embodiments recognize and take into account that this type of system may require using a computer system capable of performing digital modeling at speeds sufficient to generate feedback data for use in adjusting the parameters of the tooling system in real-time.

Thus, the illustrative embodiments provide an apparatus and method for optimizing a set of parameters for a tooling system while performing tooling operations. As used herein, "optimizing" the set of parameters may mean identifying the set of parameters that allow the tooling operations to be performed according to selected criteria with the least amount of error.

Figure 1:
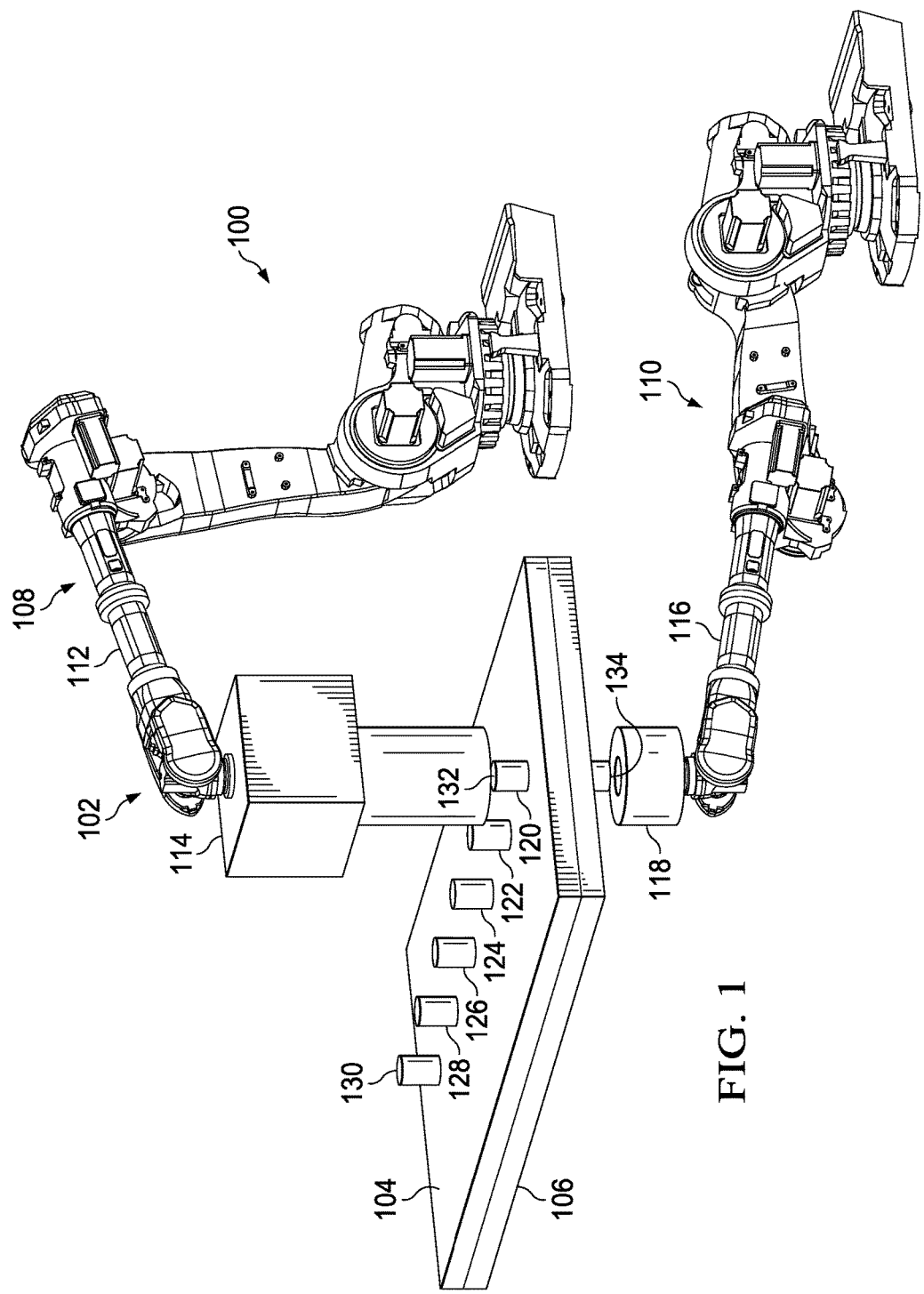
FIG. 1 is an illustration of a manufacturing environment in accordance with an illustrative embodiment.

Referring now to the figures and, in particular, with reference to FIG. 1, an illustration of a manufacturing environment is depicted in accordance with an illustrative embodiment. In this illustrative example, manufacturing environment 100 is an example of an environment in which riveting system 102 may be used to form rivets. In particular, riveting system 102 may be used to form rivets in plate 104 and plate 106 to fasten these plates together.

As depicted, riveting system 102 may include first device 108 and second device 110. First device 108 may include first robotic arm 112 and first tool 114. Second device 110 may include second robotic arm 116 and second tool 118. In one illustrative example, first tool 114 may be referred to as an anvil, while second tool 118 may be referred to as a die. In another illustrative example, both first tool 114 and second tool 118 may be referred to as dies.

First tool 114 and second tool 118 may be configured for use in forming rivets. For example, first robotic arm 112 and second robotic arm 116 may be configured to position and move first tool 114 and second tool 118 relative to plate 104 and plate 106 to form rivets.

As depicted, members 120, 122, 124, 126, 128, and 130 have been inserted through corresponding openings through plate 104 and plate 106. These members may be used to form rivets. First robotic arm 112 may be configured to use first tool 114 to apply a force to a member, such as member 120, to change a shape of first end 132 of member 120. Further, second robotic arm 116 may be configured to use second tool 118 to apply a force to member 120 to change a shape of second end 134 of member 120. More specifically, first tool 114 and second tool 118 may be used to deform first end 132 and second end 134 of member 120 such that member 120 becomes permanently installed through plate 104 and plate 106. Once first end 132 and second end 134 of member 120 have been deformed using first tool 114 and second tool 118, member 120 may be referred to as a rivet.

Figure 2:
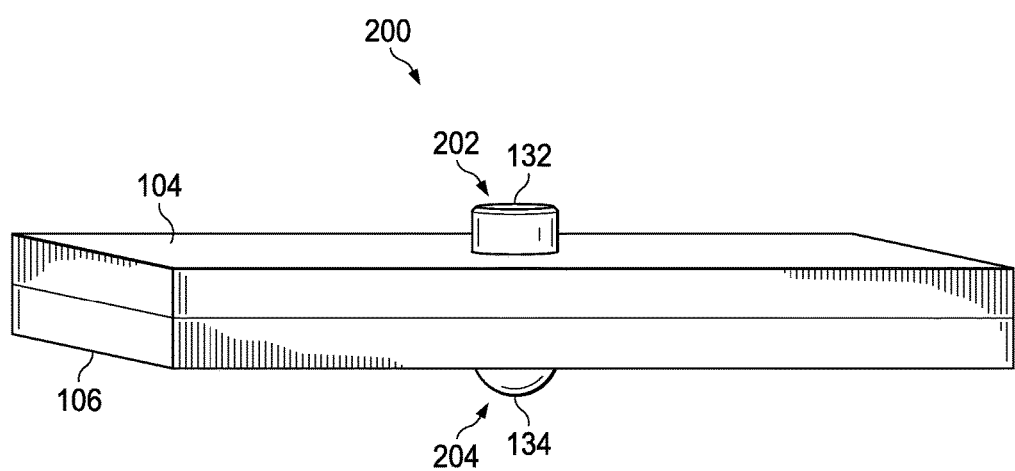
FIG. 2 is an illustration of a formed rivet in accordance with an illustrative embodiment.

With reference now to FIG. 2, an illustration of a formed rivet is depicted in accordance with an illustrative embodiment. In this illustrative example, rivet 200 may be the rivet formed when first tool 114 and second tool 118 change the shapes of first end 132 and second end 134 of member 120 in FIG. 1. As depicted, rivet 200 may have first shape 202 at first end 132 of rivet 200 and second shape 204 at second end 134 of rivet 200.

A feedback control system may be used to generate feedback data based on rivet 200 and to determine whether rivet 200 meets a set of criteria based on the feedback data. When the feedback data indicates that the rivet has not been formed according to the set of criteria, a new set of parameters may be identified for riveting system 102 using digital modeling. This new set of parameters may then be used by riveting system 102 for the next rivet to be formed.

Figure 3:
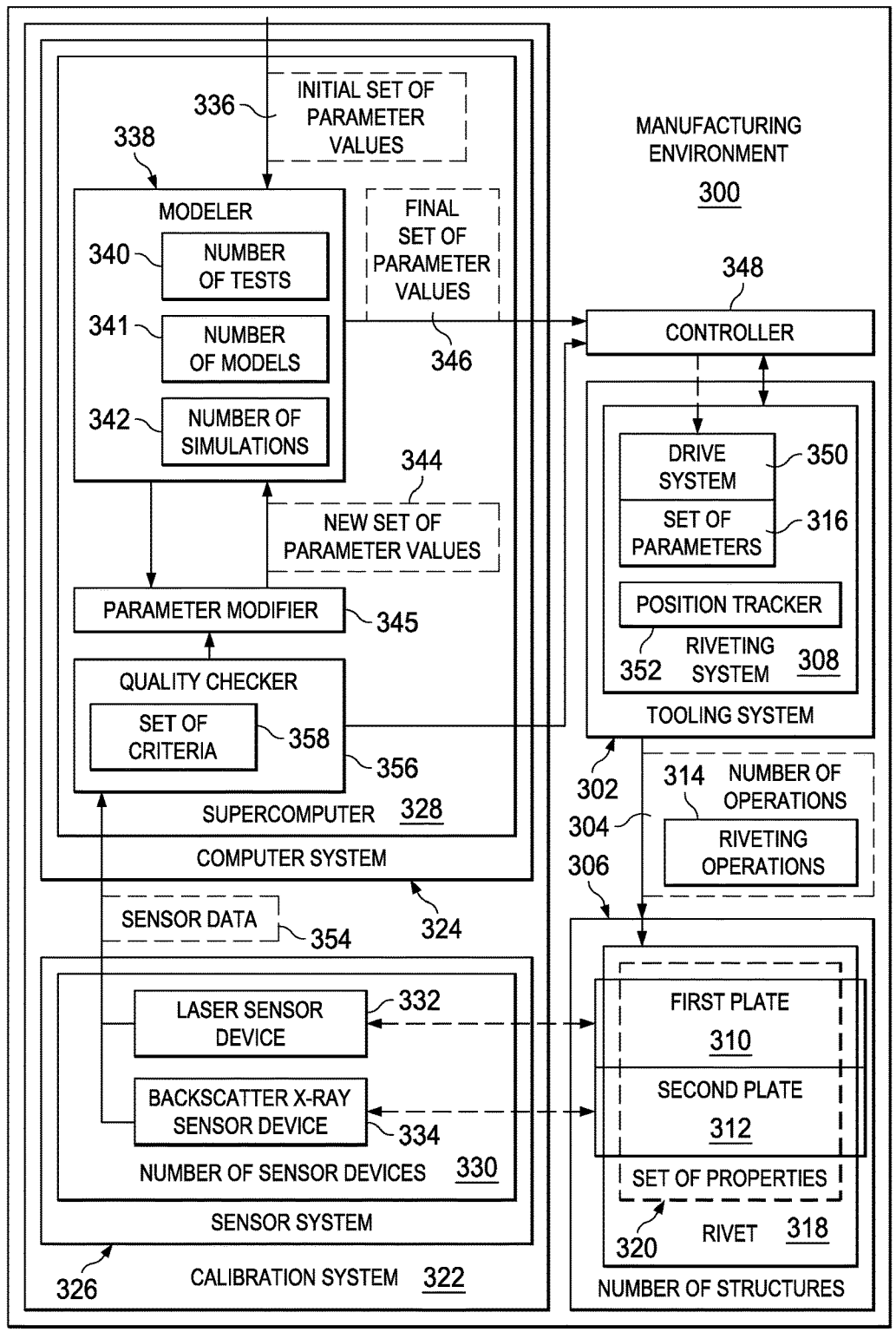
FIG. 3 is an illustration of a manufacturing environment in the form of a block diagram in accordance with an illustrative embodiment.

With reference now to FIG. 3, an illustration of a manufacturing environment is depicted in the form of a block diagram in accordance with an illustrative embodiment. In this illustrative example, manufacturing environment 300 may be an example of an environment in which tooling system 302 may be used. In this illustrative example, tooling system 302 may be used to perform number of operations 304 on number of structures 306. As used herein, a "number of" items may be one or more items. In this manner, number of operations 304 may be one or more operations. An operation in number of operations 304 may be referred to as a tooling operation. The tooling operation may be selected from at least one of a riveting operation, a drilling operation, a fastening operation, a nailing operation, a rotating operation, or some other type of operation.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In one illustrative example, tooling system 302 may take the form of riveting system 308. Riveting system 102 in FIG. 1 may be an example of one implementation for riveting system 308. Riveting system 308 may be used to form rivets that are used to fasten structures in number of structures 306, such as first plate 310 and second plate 312, to each other. In this manner, riveting system 308 may be used to perform riveting operations 314. Plate 104 and plate 106 in FIG. 1 may be an example of one implementation for first plate 310 and second plate 312.

As depicted, riveting system 308 may be configured to operate with set of parameters 316. Set of parameters 316 may determine the properties of the rivets formed using riveting system 308. For example, riveting system 308 may be used to form rivet 318 having set of properties 320. When set of parameters 316 are changed, set of properties 320 may change.

In this illustrative example, calibration system 322 may be used to identify an initial set of values for set of parameters 316 to be used by riveting system 308. Further, calibration system 322 may be configured to monitor the set of properties of each rivet formed using riveting system 308 to determine whether adjustments need to be made to these values. Calibration system 322 may include computer system 324 and sensor system 326.

Computer system 324 may be comprised of one or more computers depending on the implementation. When more than one computer is present in computer system 324, these computers may be in communication with each other. In this illustrative example, computer system 324 may be implemented in the form of supercomputer 328. Supercomputer 328 may be comprised of any number of computers, processor units, integrated circuits, microprocessors, and/or other computer hardware and/or software components configured to collectively provide significant processing power.

In this illustrative example, sensor system 326 may include number of sensor devices 330. In one illustrative example, number of sensor devices 330 may include laser sensor device 332, backscatter x-ray sensor device 334, and/or some other type of sensor device.

Prior to number of operations 304 being performed, computer system 324 may be configured to identify initial set of parameter values 336 for set of parameters 316. In some cases, computer system 324 may receive initial set of parameter values 336 in the form of user input. Of course, in other illustrative examples, computer system 324 may randomly select initial set of parameter values 336. In still other examples, computer system 324 may select initial set of parameter values 336 from a database of parameter values.

Modeler 338 in computer system 324 may be configured to receive initial set of parameter values 336. Modeler 338 may be a digital modeler. Modeler 338 may use initial set of parameter values 336 to run number of tests 340, generate number of models 341, and/or run number of simulations 342 to determine whether initial set of parameter values 336 will result in a rivet being formed according to desired specifications.

For example, modeler 338 may use finite-element assisted modeling to form number of models 341 of the rivet that would be formed by riveting system 308 based on initial set of parameter values 336. Modeler 338 may then use number of models 341 to run number of tests 340 and/or number of simulations 342 to determine whether the rivet that would be formed would meet a set of criteria specified by engineering guidelines, manufacturing guidelines, and/or design requirements.

If modeler 338 determines that initial set of parameter values 336 will result in a rivet being formed according to desired specifications, modeler 338 outputs these values as final set of parameter values 346. If modeler 338 determines that initial set of parameter values 336 will not result in a rivet being formed according to desired specifications, modeler 338 sends a message to parameter modifier 345 indicating that a new set of parameter values are needed. Parameter modifier 345 may identify and send new set of parameter values 344 to modeler 338.

This process may be iteratively performed until the current set of parameter values being evaluated have been determined to result in a rivet being formed that meets the desired specifications. These desired specifications may be, for example, set of criteria 358.

Controller 348 may be configured to receive final set of parameter values 346. Controller 348 may be configured to control riveting system 308. In one illustrative example, controller 348 may be considered part of riveting system 308. In other illustrative examples, controller 348 may be considered separate from riveting system 308.

Controller 348 may control riveting system 308 to use final set of parameter values 346 for set of parameters 316. For example, controller 348 may send one or more commands to drive system 350 of riveting system 308 to operate drive system 350 based on final set of parameter values 346. Riveting system 308 may then use final set of parameter values 346 to form a rivet, such as rivet 318.

Once rivet 318 has been formed, sensor system 326 may be used to generate sensor data 354. In particular, number of sensor devices 330 may be used to generate sensor data 354. Sensor data 354 may include, for example, without limitation, imaging data, x-ray data, laser imaging data, infrared data, and/or other types of data. Sensor data 354 may be sent to quality checker 356 in computer system 324 for processing.

Quality checker 356 may use sensor data 354 to determine whether rivet 318 has been formed according to set of criteria 358. More specifically, quality checker 356 may use sensor data 354 to identify set of properties 320 for rivet 318 and to determine whether set of properties 320 meet set of criteria 358.

If quality checker 356 determines that set of properties 320 meet set of criteria 358, quality checker 356 sends a message to controller 348 indicating that the current set of parameter values being used for set of parameters 316 may continue being used. However, if quality checker 356 determines that set of properties 320 does not meet set of criteria 358, quality checker 356 may send a message to parameter modifier 345 indicating that a new set of parameter values are needed.

Parameter modifier 345 may then select new set of parameter values 344 and send new set of parameter values 344 to modeler 338 for processing. Modeler 338 may be configured to use new set of parameter values 344 to run number of tests 340, generate number of models 341, and/or run number of simulations 342 to determine whether new set of parameter values 344 may result in a rivet being formed according to desired specifications.

As depicted, riveting system 308 may also include position tracker 352. Position tracker 352 may be configured to track a position of riveting system 308 relative to number of structures 306 on which number of operations 304 are being performed. Position tracker 352 may be configured to send position data to controller 348 and controller 348 may be configured to reposition riveting system 308 when necessary.

If modeler 338 determines that new set of parameter values 344 will result in a rivet being formed according to desired specifications, modeler 338 outputs these values as final set of parameter values 346 to controller 348. However, if modeler 338 determines that new set of parameter values 344 will not result in a rivet being formed according to desired specifications, modeler 338 sends a message to parameter modifier 345 that a different set of parameter values are needed. The process described above may be iteratively performed until new set of parameter values 344 that will result in a rivet being formed according to desired specifications has been identified.

The processes performed by quality checker 356, parameter modifier 345, and modeler 338 may be performed so quickly, using supercomputer 328, that the set of parameter values for set of parameters 316 may be adjusted while performing number of operations 304 without requiring significant delays. In this manner, calibration system 322 may provide a feedback control system for riveting system 308 that allows a set of parameter values for set of parameters 316 for riveting system 308 to be optimized while performing number of operations 304.

Figure 4:
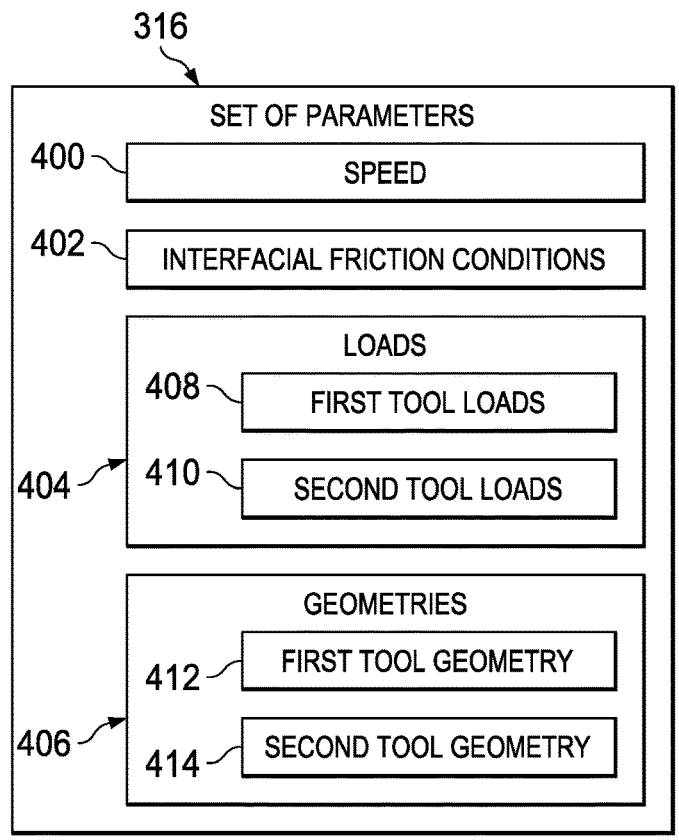
FIG. 4 is an illustration of a set of parameters for a riveting system in the form of a block diagram in accordance with an illustrative embodiment.

With reference now to FIG. 4, an illustration of set of parameters 316 for riveting system 308 in FIG. 3 is depicted in the form of a block diagram in accordance with an illustrative embodiment. As depicted, set of parameters 316 may include speed 400, interfacial friction conditions 402, loads 404, and geometries 406.

Speed 400 may be the speed at which riveting system 308 is operated. Interfacial friction conditions 402 may identify, for example, without limitation, whether the interfaces between a first tool, such as first tool 114 in FIG. 1, and a first end of a rivet, such as first end 132 in FIG. 1, and between a second tool, such as second tool 118 in FIG. 1, and a second end of a rivet, such as second end 134 in FIG. 1, are dry and/or lubricated.

Loads 404 may include the loads applied to the tools used in riveting system 308. Geometries 406 may include the geometry specifications of the tools used in riveting system 308.

For example, without limitation, loads 404 may include first tool loads 408 and second tool loads 410. First tool loads 408 may be the loads for a first tool, such as first tool 114 in FIG. 1. Second tool loads 410 may be the loads for a second tool, such as second tool 118 in FIG. 1.

Similarly, geometries 406 may include first tool geometry 412 and second tool geometry 414. First tool geometry 412 may include the geometry specifications for a first tool, such as first tool 114 in FIG. 1. Second tool geometry 414 may include the geometry specifications for a second tool, such as second tool 118 in FIG. 1. The geometry specifications for a tool may include a shape, length, width, and/or depth of the tool.

Figure 5:
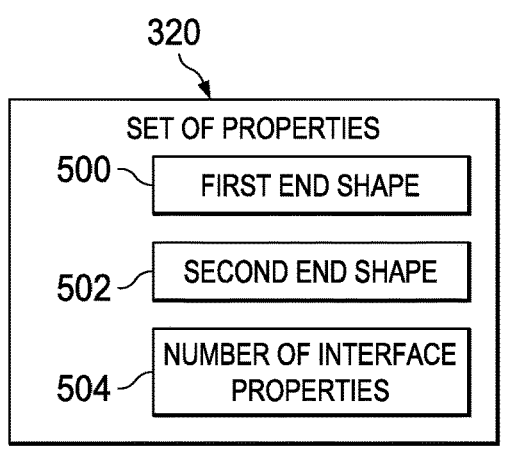
FIG. 5 is an illustration of a set of properties for a rivet in the form of a block diagram in accordance with an illustrative embodiment.

With reference now to FIG. 5, an illustration of set of properties 320 for rivet 318 in FIG. 3 is depicted in the form of a block diagram in accordance with an illustrative embodiment. As depicted, set of properties 320 may include first end shape 500, second end shape 502, and number of interface properties 504.

First end shape 500 may be the shape of a first end of rivet 318, such as first shape 202 of first end 132 of rivet 200 in FIG. 2. Second end shape 502 may be the shape of a second end of rivet 318, such as second shape 204 of second end 134 of rivet 200 in FIG. 2. Number of interface properties 504 may include, for example, without limitation, the interference fit formed by the interface between rivet 318, first plate 310, and second plate 312.

Figure 6:
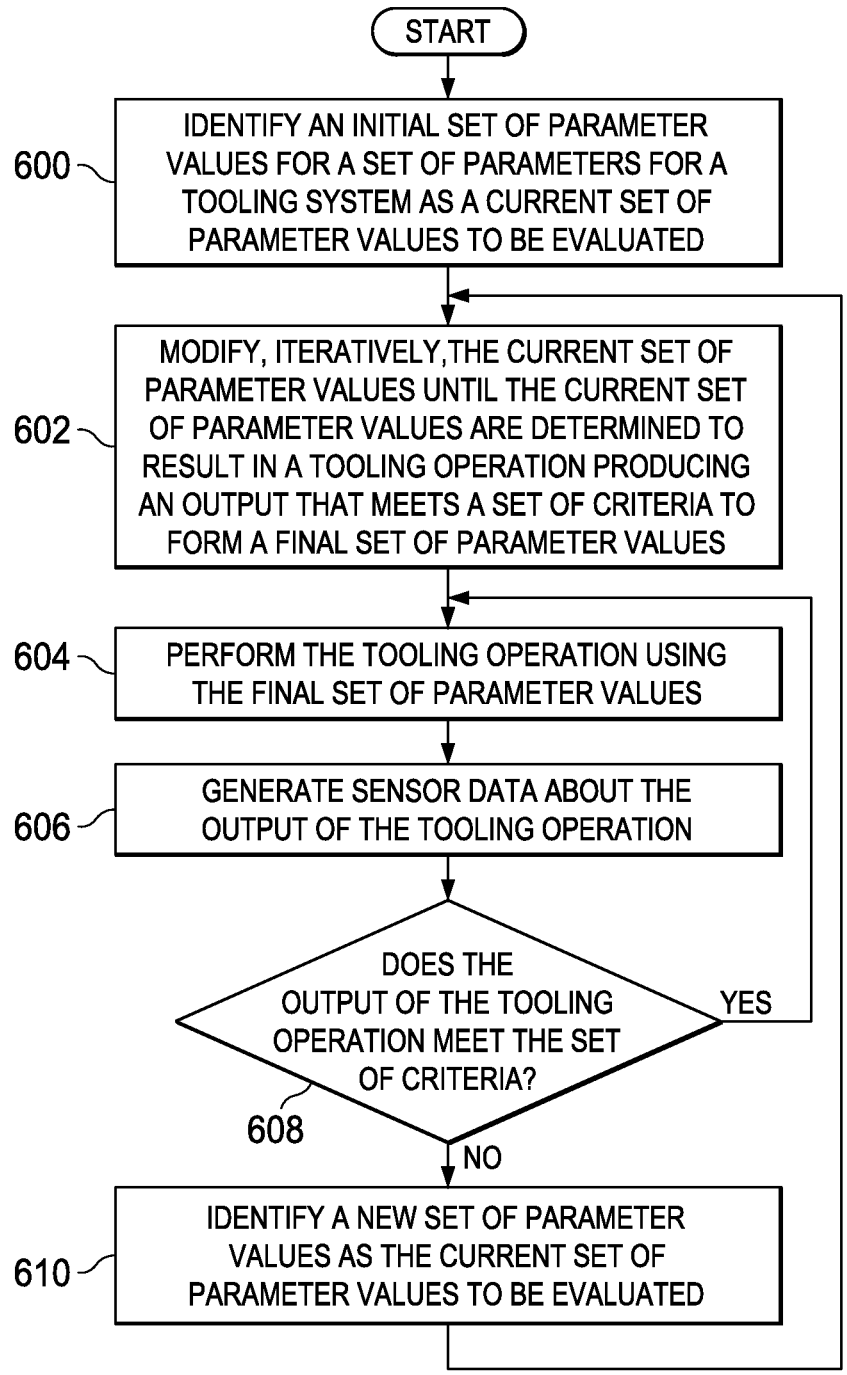
FIG. 6 is an illustration of a process for controlling tooling operations in the form of a flowchart in accordance with an illustrative embodiment.

With reference now to FIG. 6, an illustration of a process for controlling tooling operations is depicted in the form of a flowchart in accordance with an illustrative embodiment. The process illustrated in FIG. 6 may be implemented using calibration system 322 in FIG. 3.

The process may begin by identifying an initial set of parameter values for a set of parameters for a tooling system as a current set of parameter values to be evaluated (operation 600). Next, the current set of parameter values may be modified iteratively, until the current set of parameter values are determined to result in a tooling operation producing an output that meets a set of criteria, to form a final set of parameter values (operation 602).

The tooling operation may then be performed using the final set of parameter values (operation 604). Sensor data may be generated about the output of the tooling operation (operation 606). Then, a determination may be made as to whether the output of the tooling operation meets the set of criteria (operation 608).

If the output of the tooling operation meets the set of criteria, the process proceeds to operation 604 as described above. Otherwise, a new set of parameter values may be identified as the current set of parameter values to be evaluated (operation 610). The process may then return to operation 602 as described above.

Figure 7:
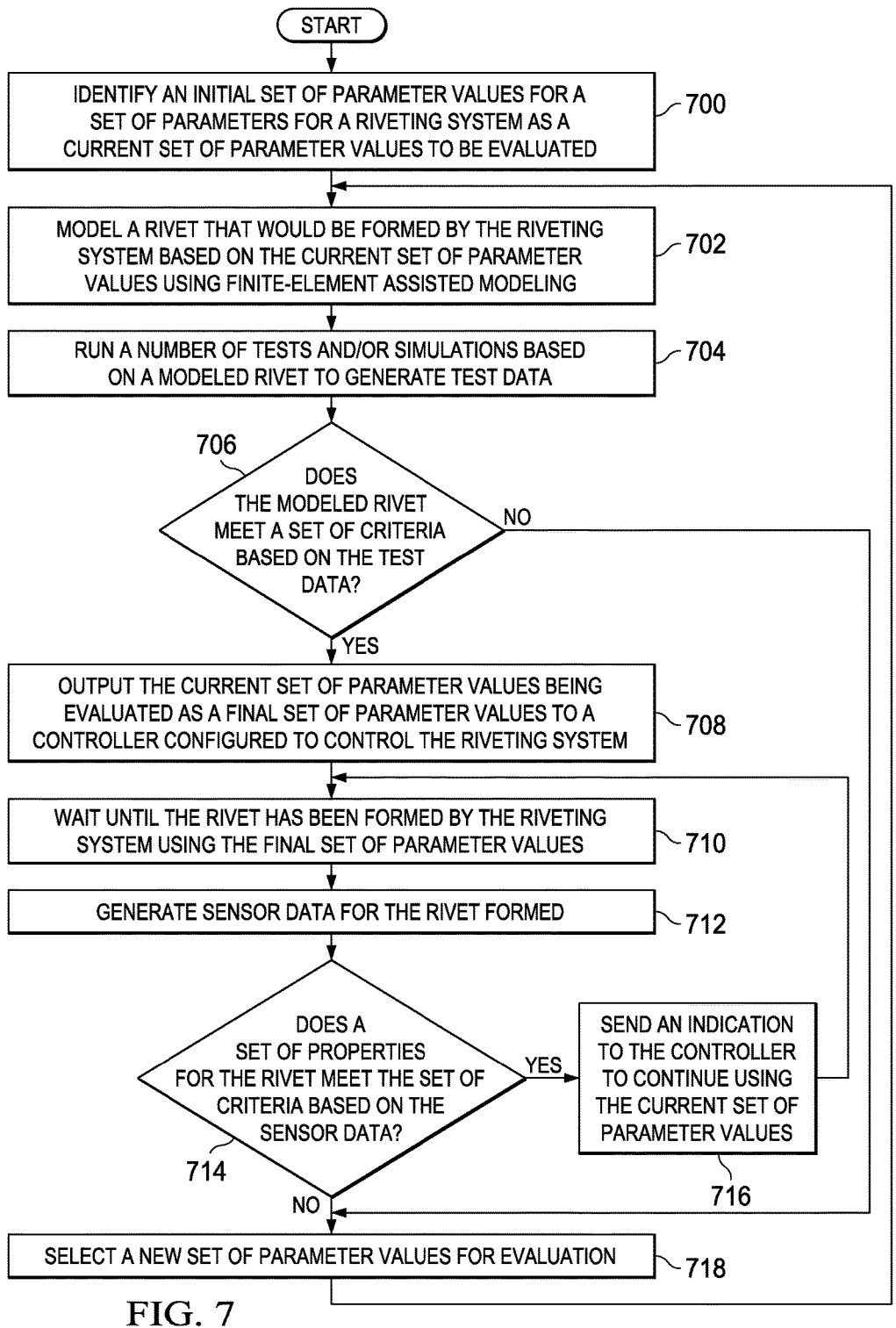
FIG. 7 is an illustration of a process for controlling riveting operations in the form of a flowchart in accordance with an illustrative embodiment.

With reference now to FIG. 7, an illustration of a process for controlling riveting operations is depicted in the form of a flowchart in accordance with an illustrative embodiment. The process illustrated in FIG. 7 may be implemented using calibration system 322 in FIG. 3.

The process may begin by identifying an initial set of parameter values for a set of parameters for a riveting system as a current set of parameter values to be evaluated (operation 700). Next, a rivet that would be formed by the riveting system based on the current set of parameter values may be modeled using finite-element assisted modeling (operation 702). A number of tests and/or simulations may be run based on a modeled rivet to generate test data (operation 704). The test data generated in operation 704 may be digital test data. A determination is made as to whether the modeled rivet meets a set of criteria based on the test data (operation 706).

If the modeled rivet meets the set of criteria, the current set of parameter values being evaluated are output as a final set of parameter values to a controller configured to control the riveting system (operation 708). The calibration system then waits until the rivet has been formed by the riveting system using the final set of parameter values (operation 710).

Sensor data is then generated for the rivet formed (operation 712). A determination is made as to whether a set of properties for the rivet meets the set of criteria based on the sensor data (operation 714). If the set of properties for the rivet meet the set of criteria, the process sends an indication to the controller to continue using the current set of parameter values (operation 716), with the process then returning to operation 710 as described above.

Otherwise, the process selects a new set of parameter values for evaluation (operation 718). The process then returns to operation 702 as described above. With reference again to operation 706, if the modeled rivet does not meet the set of criteria based on the test data, the process proceeds to operation 718 as described above.

Figure 8:
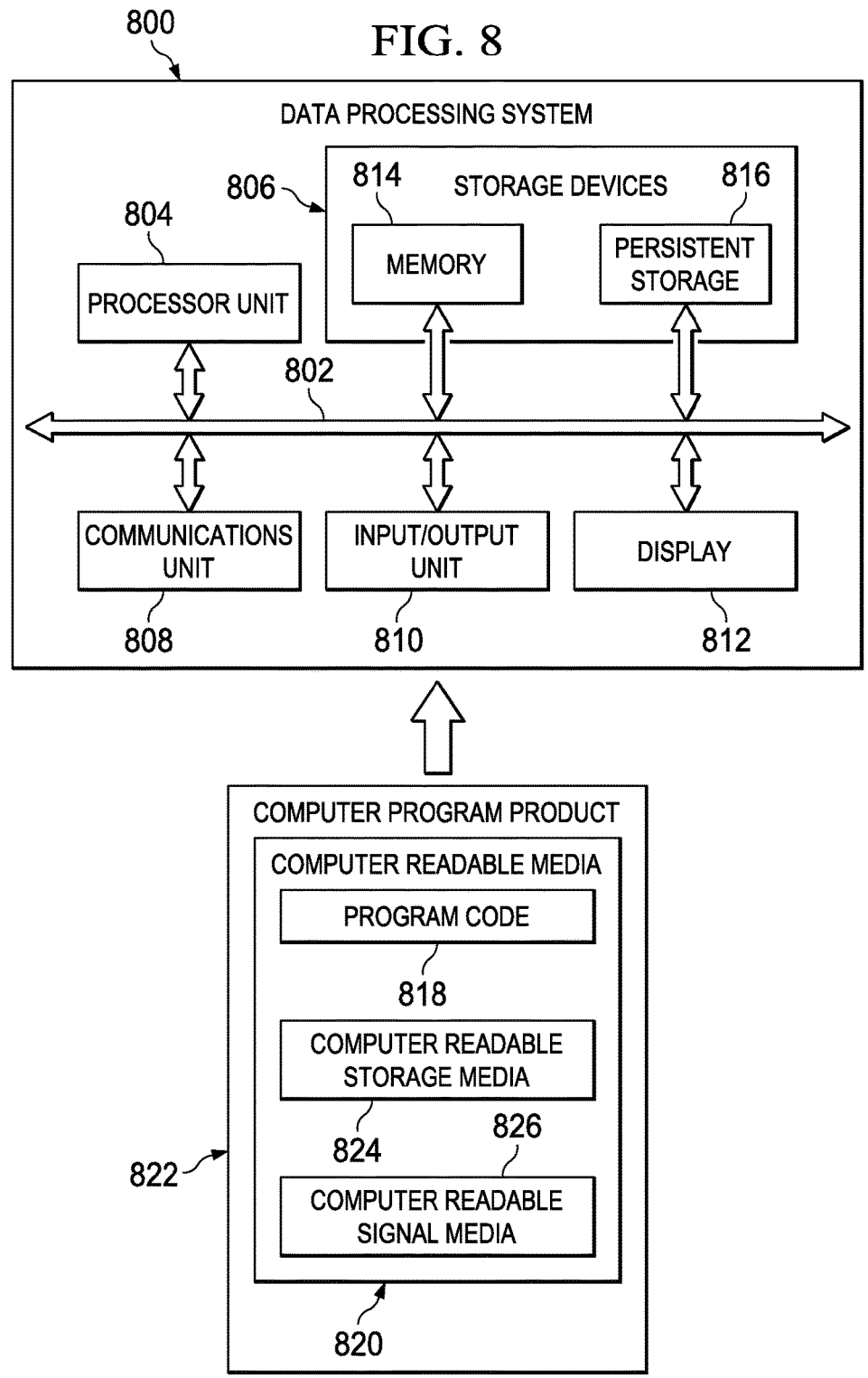
FIG. 8 is an illustration of a data processing system in the form of a block diagram in accordance with an illustrative embodiment.

Turning now to FIG. 8, an illustration of a data processing system in the form of a block diagram is depicted in accordance with an illustrative embodiment. Data processing system 800 may be used to implement one or more computers in computer system 324, supercomputer 328, modeler 338, parameter modifier 345, quality checker 356, a processor unit in one or more of number of sensor devices 330 in sensor system 326, and/or controller 348 in FIG. 3.

As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing a riveting operation by a riveting system, the method comprising:
    modifying, iteratively by a computer system, a current set of parameter values for a set of parameters for the riveting system, until the current set of parameter values predict the riveting operation producing a riveted structure that meets a set of criteria, to form a final set of parameter values, wherein the riveting system comprises a first robotic arm having an anvil or die for applying a first force to deform a first end of a member inserted between a first plate and a second plate, a second robotic arm having a die for applying a second force to deform a second end of the member, and a position tracker configured to track a position of the riveting system, wherein the position tracker sends position data to a controller;
    performing the riveting operation with the riveting system using the final set of parameter values to produce the riveted structure, wherein the riveted structure comprises the first plate, the second plate, and a rivet formed by deforming the first end of the member into a first end shape and the second end of the member into a second end shape, wherein the first end is cylindrical having a first diameter and the second end is hemispherical having a height and a second diameter adjacent the second plate;
    determining, by the computer system, whether the riveted structure of the riveting operation meets the set of criteria based on sensor data about the riveted structure of the riveting operation, wherein when a decision is made that the riveted structure of the riveting operation does not meet the set of criteria, the current set of parameter values for the set of parameters for the riveting system are recalculated while concurrently performing a number of tooling operations, wherein recalculating is defined as identifying a new set of parameters that allow a tooling operation to be performed according to the set of criteria that reduces an amount of error associated with the tooling operation, wherein the number of tooling operations includes the riveting operation, a drilling operation, a fastening operation, a nailing operation, and a rotating operation; and identifying, by the computer system, a new set of parameter values as the current set of parameter values to be evaluated in response to a determination that the riveted structure of the riveting operation does not meet the set of criteria.

2. The method of claim 1 further comprising:

repeating modifying, iteratively by the computer system, the current set of parameter values to form the final set of parameter values after identifying the new set of parameter values as the current set of parameter values to be evaluated.

3. The method of claim 1, wherein modifying, iteratively, the current set of parameter values to form the final set of parameter values comprises:

forming, by the computer system, a number of models of the riveted structure that would be produced by the riveting operation based on the current set of parameter values;

determining, by the computer system, whether the riveted structure that would be produced by the riveting operation meets the set of criteria; and identifying, by the computer system, the new set of parameter values to be evaluated as the current set of parameter values in response to the determination that the riveted structure that would be produced by the riveting operation does not meet the set of criteria.

4. The method of claim 3, wherein forming the number of models of the riveted structure that would be produced by the riveting operation based on the current set of parameter values comprises:

forming, by the computer system, the number of models of the riveted structure that would be produced by the riveting operation based on the current set of parameter values using finite-element assisted modeling.

5. The method of claim 1 further comprising:

generating the sensor data about a set of properties of the riveted structure of the riveting operation using a laser sensor device, wherein the set of properties includes at least one of the first end shape and the second end shape.

6. The method of claim 1 further comprising:

generating the sensor data about a set of properties of the riveted structure of the riveting operation using a backscatter x-ray sensor device, wherein the set of properties includes interface properties of an interference fit formed by the interface between a rivet in the riveted structure produced by the riveting operation and a set of plates fastened together by the riveting operation.

7. The method of claim 1 further comprising:

identifying, by the computer system, an initial set of parameter values for the set of parameters for the riveting system as the current set of parameter values to be evaluated based on the riveting operation to be performed, wherein the riveting operation is an operation in an assembly process.

8. The method of claim 1, wherein determining whether the riveted structure that would be produced by the riveting operation meets the set of criteria comprises:

running, by the computer system, at least one of a number of tests and a number of simulations based on a number of models to form test data; and determining, by the computer system, whether the riveted structure that would be produced by the riveting operation meets the set of criteria based on the test data, wherein the set of criteria includes specifications about a set of properties of the riveted structure, wherein the set of properties includes:

the first end shape of the rivet in the riveted structure produced by the riveting operation;

the second end shape of the rivet in the riveted structure produced by the riveting operation; and interface properties of an interference fit formed by an interface between the rivet in the riveted structure produced by the riveting operation and a set of plates fastened together by the riveting operation;

wherein the set of plates comprises the first plate and the second plate.

9. An apparatus comprising:

a riveting system comprising a first robotic arm having an anvil or die for applying a first force to deform a first end of a member inserted between a first plate and a second plate, a second robotic arm having a die for applying a second force to deform a second end of the member, and a position tracker configured to track a position of the riveting system, wherein the position tracker sends position data to a controller;

a riveted structure formed by the riveting system, wherein the riveted structure comprises the first plate, the second plate, and a rivet formed by deforming the first end of the member into a first end shape and the second end of the member into a second end shape, wherein the first end is cylindrical having a first diameter and the second end is hemispherical having a height and a second diameter adjacent the second plate;

a modeler configured to modify, iteratively, a current set of parameter values for a set of parameters for the riveting system, until the current set of parameter values predict a riveting operation producing the riveted structure that meets a set of criteria, to form a final set of parameter values;

a quality checker configured to determine whether the riveted structure of the riveting operation meets the set of criteria based on sensor data about the riveted structure of the riveting operation, wherein when a decision is made that the riveted structure of the riveting operation does not meet the set of criteria, the current set of parameter values for the set of parameters for the riveting system can be recalculated while concurrently performing a number of tooling operations, wherein recalculating is defined as identifying a set of parameters that allow a tooling operation to be performed according to the set of criteria that reduces an amount of error associated with the tooling operation, wherein the number of tooling operations includes the riveting operation, a drilling operation, a fastening operation, a nailing operation, and a rotating operation; and a parameter modifier configured to identify a new set of parameter values as the current set of parameter values to be evaluated in response to a determination that the riveted structure of the riveting operation does not meet the set of criteria;

wherein the modeler is configured to determine whether the riveted structure that would be produced by the riveting operation meets the set of criteria based on test data, wherein the test data is digital test data, wherein the set of criteria includes specifications about a set of properties of the riveted structure, wherein the set of properties includes:

the first end shape of a rivet in the riveted structure produced by the riveting operation;
the second end shape of the rivet in the riveted structure produced by the riveting operation; and
interface properties of an interference fit formed by an interface between the rivet in the riveted structure produced by the riveting operation and a set of plates fastened together by the riveting operation;
wherein the set of plates comprises the first plate and the second plate.

10. The apparatus of claim 9, wherein the modeler is configured to use the parameter modifier to iteratively modify the current set of parameter values to form the final set of parameter values.

11. The apparatus of claim 9, wherein the modeler is configured to form a number of models of the riveted structure that would be produced by the riveting operation based on the current set of parameter values and to determine whether the riveted structure that would be produced by the riveting operation meets the set of criteria.

12. The apparatus of claim 11, wherein the modeler is configured to run at least one of a number of tests and a number of simulations based on the number of models to form test data.

13. The apparatus of claim 12, wherein the parameter modifier is configured to identify the new set of parameter values to be evaluated as the current set of parameter values in response to the determination that the riveted structure that would be produced by the riveting operation does not meet the set of criteria and to send the new set of parameter values to the modeler for evaluation.

14. The apparatus of claim 9 further comprising:
the controller configured to receive the final set of parameter values and to control the riveting system based on the final set of parameter values.

15. The apparatus of claim 9 further comprising:
a sensor system configured to generate the sensor data about the riveted structure of the riveting operation performed using the final set of parameter values.

16. The apparatus of claim 9, wherein the set of parameters includes at least one of a speed, interfacial friction conditions, loads, and geometries.

17. The apparatus of claim 9, wherein the set of criteria is for a set of properties of the riveted structure produced by the riveting operation.

18. The apparatus of claim 17, wherein the riveted structure includes a rivet and wherein the set of properties includes at least one of the first end shape, the second end shape, and a number of interface properties.

19. The apparatus of claim 9, wherein the modeler, the quality checker, and the parameter modifier are implemented in a supercomputer.

* * * * *